United States Patent
Hoshi et al.

(10) Patent No.: US 10,023,938 B2
(45) Date of Patent: Jul. 17, 2018

(54) METHOD FOR RECOVERING RARE EARTH ELEMENT

(71) Applicant: HITACHI METALS, LTD., Tokyo (JP)

(72) Inventors: Hiroyuki Hoshi, Mishima-gun (JP); Yu Miyamoto, Mishima-gun (JP)

(73) Assignee: HITACHI METALS, LTD., Tokyo (JP)

(*) Notice: Subject to any disclaimer, the term of this patent is extended or adjusted under 35 U.S.C. 154(b) by 204 days.

(21) Appl. No.: 14/893,611

(22) PCT Filed: May 29, 2014

(86) PCT No.: PCT/JP2014/064279
§ 371 (c)(1),
(2) Date: Nov. 24, 2015

(87) PCT Pub. No.: WO2014/192874
PCT Pub. Date: Dec. 4, 2014

(65) Prior Publication Data
US 2016/0108498 A1    Apr. 21, 2016

(30) Foreign Application Priority Data

May 31, 2013    (JP) ................................. 2013-115234

(51) Int. Cl.
| C22B 59/00 | (2006.01) |
| C22B 7/00 | (2006.01) |
| C22B 1/00 | (2006.01) |
| C01G 1/02 | (2006.01) |
| C01G 56/00 | (2006.01) |
| C21B 11/00 | (2006.01) |
| C21B 15/02 | (2006.01) |

(52) U.S. Cl.
CPC ................ *C22B 59/00* (2013.01); *C01G 1/02* (2013.01); *C01G 56/007* (2013.01); *C21B 11/00* (2013.01); *C21B 15/02* (2013.01); *C22B 1/00* (2013.01); *C22B 7/001* (2013.01); *Y02P 10/214* (2015.11)

(58) Field of Classification Search
CPC .. C22B 7/001; C22B 9/05; C22B 9/02; C21B 11/00; C21B 15/02; C01G 1/02; C01G 56/007
See application file for complete search history.

(56) References Cited

U.S. PATENT DOCUMENTS

| 2,789,152 | A | * | 4/1957 | Ham | ...................... | C21C 5/52 |
| | | | | | | 266/211 |
| 3,378,619 | A | * | 4/1968 | Rhodes | ................... | H05B 7/02 |
| | | | | | | 373/95 |
| 2008/0298425 | A1 | * | 12/2008 | Jackson | ................. | F27B 14/04 |
| | | | | | | 373/108 |
| 2015/0344991 | A1 | | 12/2015 | Miyamoto et al. | | |

FOREIGN PATENT DOCUMENTS

| CN | 101509077 A | * | 8/2009 | | |
| CN | 102978401 A | | 3/2013 | | |
| EP | 2940163 A1 | | 11/2015 | | |
| EP | 2952594 A1 | | 12/2015 | | |
| JP | H05-202435 | | 8/1993 | | |
| JP | H10-310830 A | | 11/1998 | | |
| WO | WO 2010/098381 A1 | | 9/2010 | | |
| WO | WO-2010098381 A1 | * | 9/2010 | ............ | C22B 7/002 |
| WO | WO 2013/018710 A1 | | 2/2013 | | |

OTHER PUBLICATIONS

WO 2010098381 A1 published Sep. 2010. Machine translation.*
CN 101509077 A published Aug. 2009. Machine translation.*
WO 2010-098381 A1. Written translation. (Year: 2010).*
First Office Action dated Nov. 21, 2016 in the corresponding Chinese patent application No. 201480030934.8.
International Search Report for International Application No. PCT/JP2014/064279 dated Jul. 15, 2014.
Extended European Search Report dated Dec. 8, 2016 in the corresponding European patent application No. 14804098.3.
Masashi Nakamoto et al. "Extraction of Rare Earth Elements as Oxides from a Neodymium Magnetic Sludge", Metallurgical and Materials Transactions B, vol. 43, No. 3, Dec. 14, 2011, p. 468-476.
Nakamoto, et al. "Extraction of Rare Earth Elements as Oxides from a Neodymium Magnetic Sludge," Metallurgical and Materials Transactions B, vol. 43B, pp. 468-476 (Jun. 2012).

* cited by examiner

*Primary Examiner* — George Wyszomierski
*Assistant Examiner* — Tima M McGuthry Banks
(74) *Attorney, Agent, or Firm* — Kratz, Quintos & Hanson, LLP

(57) ABSTRACT

An object of the present invention is to provide a method according to which a rare earth element can be efficiently recovered from a workpiece containing at least a rare earth element and an iron group element, and also wear and damage to the treatment container can be suppressed, allowing the container to be used repeatedly for a long period of time. The method of the present invention as a means for resolution is characterized in that in the heat treatment of an oxidation-treated workpiece in the presence of carbon, when the oxidation-treated workpiece is placed in a treatment container, a carbon substance is interposed between the oxidation-treated workpiece and the bottom surface of the container, and the heat treatment is performed in an inert gas atmosphere or in vacuum at a temperature of 1300° C. or more.

10 Claims, No Drawings

METHOD FOR RECOVERING RARE EARTH ELEMENT

TECHNICAL FIELD

The present invention relates to a method for recovering a rare earth element from a workpiece containing at least a rare earth element and an iron group element, such as an R—Fe—B based permanent magnet (R is a rare earth element).

BACKGROUND ART

As is widely known, R—Fe—B based permanent magnets have high magnetic characteristics and thus are used in various fields today. Against such a background, in R—Fe—B based permanent magnet production plants, large amounts of magnets are produced every day. However, with an increase in the amount of magnets produced, the amounts of magnet scrap discharged as a defectively processed product or the like, magnet processing waste discharged as cutting waste, grinding waste, or the like, etc., during the production process have also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged during the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources.

Several methods have been proposed as methods for recovering a rare earth element from a workpiece containing at least a rare earth element and an iron group element. For example, Patent Document 1 proposes a method in which a workpiece is heated in an oxidizing atmosphere to convert the contained metallic elements into oxides, followed by mixing with water to form a slurry; hydrochloric acid is added with heating to dissolve a rare earth element in a solution; an alkali (sodium hydroxide, ammonia, potassium hydroxide, etc.) is added to the obtained solution with heating, thereby precipitating an iron group element leached into the solution together with the rare earth element; then the solution is separated from undissolved substances and the precipitate; and oxalic acid, for example, is added to the solution as a precipitant to recover the rare earth element in the form of an oxalate. This method is noteworthy as a method that allows a rare earth element to be effectively separated from an iron group element and recovered. However, the method has a problem in that because an acid and an alkali are used in part of the process, it is not easy to control the process, and also the recovery cost is high. Therefore, it must be said that in some aspects, the method described in Patent Document 1 is difficult to put into practical use as a recycling system that is required to be low-cost and simple.

In addition, as a method for not oxidizing an iron group element contained in a workpiece but oxidizing only a rare earth element contained in the workpiece to thereby separate the two, Patent Document 2 proposes a method in which a workpiece is heated in a carbon crucible. Unlike the method described in Patent Document 1, this method does not require an acid or an alkali. In addition, when a workpiece is heated in a carbon crucible, theoretically, the atmosphere in the crucible is autonomously controlled to an oxygen partial pressure at which iron group elements are not oxidized and only rare earth elements are oxidized. Accordingly, this method is likely to be more advantageous than the method described in Patent Document 1 in that the process is simpler. However, when it comes to the question whether the atmosphere in a carbon crucible is autonomously controlled to a predetermined oxygen partial pressure by merely heating a workpiece in the crucible, whereby rare earth elements can be separated from iron group elements, the reality is not necessarily so. Patent Document 2 states that the oxygen content of the atmosphere in a crucible is preferably 1 ppm to 1%, but essentially no external operation is required to control the atmosphere. However, according to the study by the present inventors, at least in the case where the oxygen content is less than 1 ppm, rare earth elements cannot be separated from iron group elements. Therefore, even if it is theoretically possible that when a workpiece is heated in a carbon crucible, the atmosphere in the crucible is autonomously controlled to an oxygen partial pressure at which iron group elements are not oxidized and only rare earth elements are oxidized, in reality, the inside of the crucible has to be artificially controlled to an atmosphere having an oxygen content of 1 ppm or more. Such control can be achieved by introducing an inert gas having an oxygen content of 1 ppm or more into a crucible, as also described in Patent Document 2. However, in the case of argon gas, which is widely used as an industrial inert gas, its oxygen content is usually 0.5 ppm or less. Therefore, for introducing argon gas having an oxygen content of 1 ppm or more into a crucible, the widely used argon gas cannot be directly used, and it is necessary to especially increase the oxygen content before use. Consequently, although the process of the method described in Patent Document 2 looks simple, actually it is not. It must be said that like the method described in Patent Document 1, in some aspects, the method described in Patent Document 2 is difficult to put into practical use as a recycling system that is required to be low-cost and simple.

Thus, as a method for recovering a rare earth element from a workpiece containing at least a rare earth element and an iron group element, which can be put into practical use as a low-cost, simple recycling system, the present inventors have proposed, in Patent Document 3, a method in which a workpiece is subjected to an oxidation treatment, then the treatment environment is turned into an environment where carbon is present, and an oxidation-treated workpiece is subjected to a heat treatment, whereby a rare earth element is separated in the form of an oxide from an iron group element and recovered.

PRIOR ART DOCUMENTS

Patent Document

Patent Document 1: JP-A-2009-249674
Patent Document 2: WO 2010/098381
Patent Document 3: WO 2013/018710

SUMMARY OF THE INVENTION

Problems that the Invention is to Solve

According to the method proposed by the present inventors in Patent Document 3, a heat treatment is performed using a carbon crucible as a treatment container. Thus, the carbon crucible also plays a role as a carbon supply source from the surface thereof to the oxidation-treated workpiece, whereby rare earth elements can be efficiently recovered. However, when a carbon crucible plays a role as a carbon supply source to the oxidation-treated workpiece, the carbon crucible is consumed and gradually worn. In addition, as a result of the subsequent research by the prevent inventors, it has been revealed that when the oxidation-treated workpiece and a carbon supply source are placed in a non-carbon treatment container, such as a ceramic crucible made of a metal oxide including alumina, magnesium oxide, calcium oxide, etc., or silicon oxide, and heat-treated, iron group elements contained in the oxidation-treated workpiece dissolve with components of the treatment container, whereby the heat treatment product sticks to the inner surface of the container, and its removal causes damage to the treatment container.

Thus, an object of the present invention is to provide a method for recovering a rare earth element, including subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, according to which a rare earth element can be efficiently recovered, and also wear and damage to the treatment container can be suppressed, allowing the container to be used repeatedly for a long period of time.

Means for Solving the Problems

In view of the above points, the present inventors have conducted extensive research. As a result, they have found the following. In the heat treatment of an oxidation-treated workpiece in the presence of carbon, when the oxidation-treated workpiece is placed in a treatment container, a carbon substance is interposed between the oxidation-treated workpiece and the bottom surface of the container, and the heat treatment is performed in an inert gas atmosphere or in vacuum at a temperature of 1300° C. or more. As a result, the carbon substance interposed between the oxidation-treated workpiece and the bottom surface of the container plays a role as a carbon supply source to the oxidation-treated workpiece and also plays a role in preventing the oxidation-treated workpiece from contacting the bottom surface of the container.

Accordingly, rare earth elements can be efficiently recovered, and also wear and damage to the treatment container can be suppressed, allowing the container to be used repeatedly for a long period of time.

A method for recovering a rare earth element of the present invention accomplished based on the above findings, which comprises subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, is characterized in that, as defined in claim 1, in the heat treatment of the oxidation-treated workpiece in the presence of carbon, when the oxidation-treated workpiece is placed in a treatment container, a carbon substance is interposed between the oxidation-treated workpiece and the bottom surface of the container, and the heat treatment is performed in an inert gas atmosphere or in vacuum at a temperature of 1300° C. or more.

A method as defined in claim 2 is characterized in that in the method of claim 1, at least part of the workpiece is in granular or powder form having a particle size of 500 μm or less.

A method as defined in claim 3 is characterized in that in the method of claim 1, the workpiece has an iron group element content of 30 mass % or more.

A method as defined in claim 4 is characterized in that in the method of claim 1, the workpiece is an R—Fe—B based permanent magnet.

A method as defined in claim 5 is characterized in that in the method of claim 1, the oxidation-treated workpiece housed in a housing member made of paper, wood, synthetic resin, or carbon is placed in the treatment container.

A method as defined in claim 6 is characterized in that in the method of claim 1, a carbon substance housed in a housing member made of paper, wood, synthetic resin, or carbon is interposed between the oxidation-treated workpiece and the bottom surface of the container.

A method as defined in claim 7 is characterized in that in the method of claim 1, a carbon substance is further interposed between the oxidation-treated workpiece and the side surface of the container.

A method as defined in claim 8 is characterized in that in the method of claim 7, the carbon substance interposed between the oxidation-treated workpiece and the side surface of the container is partitioned from the oxidation-treated workpiece by a partition member made of paper, wood, synthetic resin, or carbon.

A method as defined in claim 9 is characterized in that in the method of claim 7, a carbon substance housed in a housing member made of paper, wood, synthetic resin, or carbon is interposed between the oxidation-treated workpiece and the side surface of the container.

A method as defined in claim 10 is characterized in that in the method of claim 1, a carbon substance is further placed in the treatment container.

Effect of the Invention

According to the method of the present invention, a rare earth element can be efficiently recovered from a workpiece containing at least a rare earth element and an iron group element, and also wear and damage to the treatment container can be suppressed, allowing the container to be used repeatedly for a long period of time.

Mode for Carrying Out the Invention

The method for recovering a rare earth element of the present invention, which comprises subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, is characterized in that in the heat treatment of the oxidation-treated workpiece in the presence of carbon, when the oxidation-treated workpiece is placed in a treatment container, a carbon substance is interposed between the oxidation-treated workpiece and the bottom surface of the container, and the heat treatment is performed in an inert gas atmosphere or in vacuum at a temperature of 1300° C. or more.

The workpiece containing at least a rare earth element and an iron group element, to which the method of the present invention is to be applied, is not particularly limited as long as it contains a rare earth element, such as Nd, Pr, Dy, Tb, or Sm, and an iron group element, such as Fe, Co, or Ni. In addition to a rare earth element and an iron group element, additional elements such as boron may also be contained. Specific examples include R—Fe—B based permanent magnets. However, the method of the present invention is particularly suitable for application to a workpiece having an iron group element content of 30 mass % or more (e.g., in the case of an R—Fe—B based permanent magnet, the iron group element content thereof is usually 60 mass % to 82 mass %). The size or form of the workpiece is not particularly limited. In the case where the workpiece is an R—Fe—B based permanent magnet, it may be magnet scrap, magnet processing waste, or the like discharged during the production process. In order for the workpiece to be sufficiently oxidation-treated, it is preferable that the workpiece is in granular or powder form having a particle size of 500 µm or less (e.g., in view of the ease of preparation, the lower limit of the particle size is preferably 1 µl). However, the entire workpiece does not necessarily have to be in such granular or powder form, and it is possible that only part of the workpiece is in granular or powder form.

First, in the method of the present invention, the oxidation treatment of a workpiece intends to convert a rare earth element contained in the workpiece into an oxide. Unlike the method described in Patent Document 2, as a result of the oxidation treatment of a workpiece, not only a rare earth element but also an iron group element contained in the workpiece may be converted into an oxide. The oxidation treatment of a workpiece can be easily performed by heat-treating or burning the workpiece in an oxygen-containing atmosphere. The oxygen-containing atmosphere may be ambient atmosphere. In the case where the workpiece is heat-treated, it may be performed at 350° C. to 1000° C. for 1 hour to 12 hours, for example. In the case where the workpiece is burned, it may be performed by spontaneous ignition or artificial ignition, for example. In addition, the oxidation treatment of a workpiece may also be performed by an alkali treatment, in which the oxidation of a workpiece proceeds in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution may be 0.1 mol/L to 10 mol/L. The treatment temperature may be 60° C. to 150° C., but is preferably 100° C. or more to increase the effectiveness of the oxidation treatment, and preferably 130° C. or less to further enhance safety. The treatment time may be 30 minutes to 10 hours. The oxidation treatment of a workpiece may be performed by a single method or may also be performed by a combination of a plurality of methods. As a result of the oxidation treatment of a workpiece in this manner, the molar concentration of oxygen contained in the workpiece becomes 1.5 times or more the molar concentration of a rare earth element, whereby the rare earth element can be converted into an oxide more reliably. It is preferable that as a result of the oxidation treatment, the molar concentration of oxygen contained in the workpiece becomes 2.0 times or more the molar concentration of a rare earth element. In addition, it is preferable that the oxidation treatment of a workpiece is performed in the absence of carbon. This is because when the oxidation treatment of a workpiece is performed in the presence of carbon, a rare earth element contained in the workpiece may undergo an undesirable chemical reaction with carbon, thereby inhibiting the desired conversion into an oxide (thus, "in the absence of carbon" herein means that carbon that causes a chemical reaction enough to inhibit the conversion of a rare earth element contained in the workpiece into an oxide is not present).

Next, the oxidation-treated workpiece is placed in a treatment container. At this time, a carbon substance is interposed between the oxidation-treated workpiece and the bottom surface of the container. Then, a heat treatment is performed in an inert gas atmosphere or in vacuum at a temperature of 1300° C. or more. As a result, the carbon substance interposed between the oxidation-treated workpiece and the bottom surface of the container plays a role as a carbon supply source to the oxidation-treated workpiece and also plays a role in preventing the oxidation-treated workpiece from contacting the bottom surface of the container. Because the carbon substance interposed between the oxidation-treated workpiece and the bottom surface of the container plays a role as a carbon supply source to the oxidation-treated workpiece, a rare earth element can be efficiently separated in the form of an oxide from an iron group element. This is based on the following phenomenon found by the present inventors. When the oxidation-treated workpiece is subjected to a heat treatment at a temperature of 1300° C. or more while supplying a carbon substance as a carbon supply source, an oxide of a rare earth element contained in the oxidation-treated workpiece melts while remaining an oxide at a high temperature. Meanwhile, an iron group element dissolves carbon derived from the carbon substance to form an alloy and melts, and an oxide of an iron group element is reduced by carbon, then dissolves carbon to form an alloy and melts. As a result, a melt of an oxide of a rare earth element and a melt of an alloy of an iron group element and carbon are present independently of each other without compatibility. The role of carbon is thus completely different from that in the method described in Patent Document 2, in which carbon is used to oxidize only a rare earth element, without oxidizing an iron group element, contained in the workpiece. The reason why the heat treatment temperature is specified to 1300° C. or more is that when the temperature is less than 1300° C., an oxide of a rare earth element and an alloy of an iron group element and carbon are less likely to melt, making it difficult to separate the two. The heat treatment temperature is preferably 1350° C. or more, more preferably 1400° C. or more, and still more preferably 1450° C. or more. Incidentally, in view of energy cost, for example, the upper limit of the heat treatment temperature is preferably 1700° C., more preferably 1650° C., and still more preferably 1600° C. The reason why the heat treatment of the oxidation-treated workpiece in the presence of a carbon substance is performed in an inert gas atmosphere or in vacuum is that when the heat treatment is performed in an oxygen-containing atmosphere such as ambient atmosphere, oxygen in the atmosphere may react with the carbon substance to produce carbon dioxide, preventing the carbon substance from efficiently playing a role as a carbon supply source to the oxidation-treated workpiece. Another reason is that in the case where the carbon substance is not consumed as a carbon supply source and remains in the treatment container after the heat treatment, the remaining carbon substance in the treatment container can be easily recovered and reused. When the heat treatment is performed in an oxygen-containing atmosphere, depending on the kind or form of a carbon substance, the carbon substance that has not been consumed as a carbon supply source in the treatment container may react with oxygen in the atmosphere to form carbon dioxide and be discharged from the treatment container, making it impossible to recover after the heat treatment. An inert gas atmosphere can be formed using argon gas, helium gas, nitrogen gas, etc. The oxygen content thereof is preferably less than 1 ppm. In addition, the vacuum level is preferably less than 1000 Pa. Incidentally, the heat treatment time is suitably 1 minute to 3 hours, for example.

In addition, in the method of the present invention, the carbon substance interposed between the oxidation-treated workpiece and the bottom surface of the container plays a role in preventing the oxidation-treated workpiece from contacting the bottom surface of the container. As a result, wear and damage to the treatment container can be suppressed, allowing the container to be used repeatedly for a long period of time.

The carbon substance used in the method of the present invention is not particularly limited in the kind or form as long as, when interposed between the oxidation-treated workpiece and the bottom surface of the container, it plays a role as a carbon supply source to the oxidation-treated workpiece and also plays a role in preventing the oxidation-treated workpiece from contacting the bottom surface of the container. Specific examples of carbon substances include carbon black, petroleum coke, graphite (black lead and plumbago), charcoal, coal, and diamond. Among them, carbon black, whose portion that has not been consumed as a carbon supply source and remains in the treatment container can be easily recovered after the heat treatment and reused, and petroleum coke, which is available at low cost and easy to handle, and the like are preferable as carbon substances. Carbon black is fine particles of carbon having an average particle size of 1 nm to 500 nm. It is usually in the form of a powder made of aggregated particles formed by aggregating fine particles and having a size of about 1 μm to about 1 mm, wherein individual fine particles are fused to each other in a linear chain or in an irregular, complicated branched chain. Specific examples of carbon blacks include furnace black produced by the furnace process, channel black produced by the channel process, acetylene black produced by the acetylene process, and thermal black produced by the thermal process. They may be commercially available products. They may be used alone, and it is also possible to use a mixture of two or more kinds. In addition, for the purpose of preventing the formation of dust or improving handleability, etc., the carbon black may also be particles granulated in the form of beads having a size of about 300 μm to about 3 mm. Petroleum coke means cork made from petroleum. Specifically, it is a substance containing, as a main component, carbon obtained by the pyrolysis treatment, which is called coking, of heavy oil, such as reduced crude or vacuum residue, for example. Petroleum coke includes delayed coke that is generally called petroleum coke, as well as raw coke collected from the coker and directly used, calcined coke obtained by burning raw coke to remove volatiles, and the like. In addition, depending on the coking method, there also is fluid coke, which is in powder form and used as a fuel. In the method of the present invention, any such petroleum coke may be used. The petroleum coke may be in granular or powder form having a particle size of 10 mm or less.

The material of the treatment container to place the oxidation-treated workpiece is not particularly limited. In addition to a carbon crucible used in the method described in Patent Document 2, it is also possible to use a non-carbon treatment container, such as a ceramic crucible made of a metal oxide including alumina, magnesium oxide, calcium oxide, etc., or silicon oxide (it may be made of a single material or may also be made of a plurality of materials). In particular, according to the method of the present invention, a ceramic crucible, such as an alumina crucible, which is more inexpensive as compared with a carbon crucible may be used as a treatment container to efficiently recover a rare earth element from a workpiece containing at least a rare earth element and an iron group element. At the same time, wear and damage to the treatment container can be suppressed, allowing the container to be used repeatedly for a long period of time. This is advantageous in putting the method of the present invention into practical use as a recycling system that is required to be low-cost and simple.

The mode of interposing a carbon substance between the oxidation-treated workpiece and the bottom surface of the container is not particularly limited as long as the carbon substance plays a role as a carbon supply source to the oxidation-treated workpiece and also plays a role in preventing the oxidation-treated workpiece from contacting the bottom surface of the container, and may be suitably selected according to the kind or form of a carbon substance. For example, in the case where the carbon substance is in powder, granular, or massive form, it is possible that the bottom surface of the container is covered with the carbon substance, and the oxidation-treated workpiece is placed thereon. In addition, in the case where the carbon substance is in sheet or plate form, it is possible that the carbon substance is laid on the bottom surface of the container, and the oxidation-treated workpiece is placed thereon. As a result, even in the case where a carbon crucible is used as a treatment container, it is possible to suppress the phenomenon that the carbon crucible plays a role as a carbon supply source and thus is consumed and worn. In addition, even in the case where a non-carbon treatment container is used, it is possible to suppress the phenomenon that iron group elements contained in the oxidation-treated workpiece dissolve with components of the treatment container, whereby the heat treatment product sticks to the inner surface of the container, and its removal causes damage to the treatment container. The carbon substance amount used depends also on the degree of oxidation of an iron group element contained in the workpiece as a result of the previous oxidation treatment, but is preferably 0.5 times or more, in the molar ratio, an iron group element contained in the workpiece, more preferably 1.0 time or more, and still more preferably 1.5 times or more. When the carbon substance amount used is less than 0.5 times, in the molar ratio, an iron group element contained in the workpiece, in the case where iron group elements contained in the workpiece are converted into oxides by the oxidation treatment, it may be difficult to reliably reduce the oxides and allow for the progress of alloying with carbon. In addition, the carbon substance may be entirely consumed as a carbon supply source during the heat treatment, which makes it impossible for the carbon substance to play a role in preventing the oxidation-treated workpiece from contacting the bottom surface of the container. When the carbon substance amount used is adjusted to be 1.5 times or more, in the molar ratio, an iron group element contained in the workpiece, even when the iron group elements contained in the workpiece are entirely converted into oxides by the oxidation treatment, the oxides can be reliably reduced, allowing for the progress of alloying with carbon. In addition, the consumption of the entire carbon substance as a carbon supply source during the heat treatment, which makes it impossible for the carbon substance to play a role in preventing the oxidation-treated workpiece from contacting the bottom surface of the container, can be avoided. Incidentally, the upper limit of the carbon substance amount used is not particularly limited. Even when the carbon substance is present in excess amount, this does not adversely affect the separation between a rare earth element and an iron group element.

The oxidation-treated workpiece may be housed in a housing member (bag member, etc.) and then placed in a treatment container. Examples of housing members include those made of materials that are, as a result of the heat treatment, converted into hydrocarbon, carbon dioxide, or the like and discharged from the treatment container or converted into charcoal that does not adversely affect the separation between a rare earth element and an iron group element, such as those made of paper (general paper, corrugated paper, etc.), wood, synthetic resin (polyethylene, polypropylene, polyethylene terephthalate, etc.), carbon, and the like. In addition, in the case where the carbon substance interposed between the oxidation-treated workpiece and the bottom surface of the container is in powder, granular, or massive form, the carbon substance may be housed in a housing member made of such a material and then installed on the bottom surface of the container. By employing such a mode, preparation for the heat treatment of the oxidation-treated workpiece in the presence of a carbon substance can be performed more efficiently.

Incidentally, in the case where the oxidation-treated workpiece placed in a treatment container contacts or may contact the side surface of the container, in addition to between the oxidation-treated workpiece and the bottom surface of the container, a carbon substance may further be interposed between the oxidation-treated workpiece and the side surface of the container. The mode of interposing a carbon substance between the oxidation-treated workpiece and the side surface of the container may be as follows, for example. In the case where the carbon substance is in powder, granular, or massive form, a partition member having a cylindrical shape or a polygonal cylindrical shape is installed to stand in the treatment container, and a carbon substance is packed between the side surface of the container and the partition member. At the same time, the oxidation-treated workpiece is placed in the inside surrounded by the partition member so that the carbon substance interposed between the oxidation-treated workpiece and the side surface of the container is partitioned from the oxidation-treated workpiece by the partition member. By employing such a mode, the collapse of the carbon substance interposed between the oxidation-treated workpiece and the side surface of the container, which makes it impossible for the carbon substance to play a role in preventing the oxidation-treated workpiece from contacting the side surface of the container, can be avoided. As the partition member, one made of paper, wood, synthetic resin, carbon, or the like as mentioned above, for example, may be used. Incidentally, in the case where the carbon substance interposed between the oxidation-treated workpiece and the side surface of the container is in powder, granular, or massive form, the carbon substance may be housed in a housing member made of such a material. In addition, the mode of interposing a carbon substance between the oxidation-treated workpiece and the side surface of the container may be as follows, for example. In the case where the carbon substance is in sheet form, it is possible that the sheet-form carbon substance is formed into a cylindrical shape and installed to stand in the treatment container, and the oxidation-treated workpiece is placed in the inside thereof. In the case where the carbon substance is in plate form, it is possible that a plurality of plate-form carbon substances are installed in a polygonal cylindrical shape to stand in the treatment container, and the oxidation-treated workpiece is placed in the inside thereof. When the kind of the carbon substance interposed between the oxidation-treated workpiece and the side surface of the container is made the same as the kind of the carbon substance interposed between the oxidation-treated workpiece and the bottom surface of the container, it is convenient in that the carbon substances in the treatment container after the heat treatment can be recovered all together and reused.

In addition, in the method of the present invention, in addition to the carbon substance interposed between the oxidation-treated workpiece and the bottom surface of the container and the carbon substance interposed between the oxidation-treated workpiece and the side surface of the container, a carbon substance that plays a role as a carbon supply source to the oxidation-treated workpiece (in this paragraph, hereinafter referred to as "carbon substance for carbon supply") may be further placed in the treatment container. Specific examples of carbon substances for carbon supply include carbon black, petroleum coke, graphite, charcoal, coal, and diamond as mentioned above, for example. Such a carbon substance may be in powder, granular, massive, sheet, or plate form. In the case where a carbon substance for carbon supply is further placed in the treatment container, the placement method is not particularly limited as long as the role is played. However, in terms of playing the role effectively, it is preferable that the carbon substance for carbon supply is in powder, granular, or massive form, and is placed such that it is present in a mixed state with the oxidation-treated workpiece in the treatment container. The method for bringing the oxidation-treated workpiece and the carbon substance for carbon supply into a mixed state in a treatment container is not particularly limited. For example, a method in which the oxidation-treated workpiece and the carbon substance for carbon supply are previously mixed and then placed in a treatment container can be mentioned. In this case, the mixture of the oxidation-treated workpiece and the carbon substance for carbon supply may be a simple mixture, or may also be pressed into a briquette, for example. Incidentally, with respect to the oxidation-treated workpiece and the carbon substance for carbon supply, it is possible that a mixture of the two is housed in a housing member made of paper, wood, synthetic resin, carbon, or the like as mentioned above, for example, and then placed in a treatment container, or that they are housed in a housing member, mixed therein, and then placed in a treatment container. In addition, in the case where the size of the individual carbon substance for carbon supply is smaller than the size of the individual oxidation-treated workpiece, when the oxidation-treated workpiece is placed in a treatment container, and then the carbon substance for carbon supply is supplied from the above, the individual carbon substance for carbon supply enters the voids between the individual oxidation-treated workpieces, whereby the oxidation-treated workpiece and the carbon substance for carbon supply can be brought into a mixed state. In the case where the oxidation-treated workpiece and the carbon substance for carbon supply are brought into a mixed state in a treatment container, the carbon substance interposed between the oxidation-treated workpiece and the bottom surface of the container exclusively plays a role in preventing the oxidation-treated workpiece from contacting the bottom surface of the container. Therefore, it is not necessary to consider the consumption as a carbon supply source in determining the amount to be used. Meanwhile, even when the iron group elements contained in the workpiece are entirely converted into oxides by the oxidation treatment, in order to reliably reduce the oxides and allow for the progress of alloying with carbon, the carbon substance for carbon supply amount used is preferably φ0.5 times or more, in the molar ratio, an iron group element contained in the workpiece, more preferably 1.0 time or more, and still more preferably 1.5 times or more. In the case where a carbon substance for carbon supply is further placed in the treatment container, the placement method may be a method in which the carbon substance for carbon supply is accumulated on the oxidation-treated workpiece placed in the treatment container, etc. For example, in the case where the carbon substance for carbon supply is in powder, granular, or massive form, and the individual size is greater than the size of the individual oxidation-treated workpiece, the carbon substance for carbon supply may be accumulated on the oxidation-treated workpiece. In addition, in the case where a carbon substance for carbon supply is further placed in the treatment container, the placement method may be a method in which the carbon substance for carbon supply in powder, granular, or massive form is housed in a housing member made of paper, wood, synthetic resin, carbon, or the like as mentioned above, for example, and then mounted on the oxidation-treated workpiece, a method in which the carbon substance for carbon supply in sheet or plate form is mounted on the oxidation-treated workpiece, or the like. When the kind of the carbon substance for carbon supply is made the same as the kind of the carbon substance interposed between the oxidation-treated workpiece and the bottom surface of the container or the kind of the carbon substance interposed between the oxidation-treated workpiece and the side surface of the container, it is convenient in that the carbon substances in the treatment container after the heat treatment can be recovered all together and reused.

When the oxidation-treated workpiece is thus subjected to a heat treatment in the presence of a carbon substance and then cooled, although depending on the difference in the heat treatment temperature or the heat treatment time, the difference in the kind of the carbon substance and the amount used, etc., in general, in the case where the carbon substance amount used is small, in the treatment container, as the heat treatment product, two kinds of masses are present in close contact with each other. With an increase in the amount used, a single-form mass having adhering to the sphere surface thereof an adhering substance that easily comes off upon the application of physical impact gradually appears. In addition, a mass microscopically having a two phase structure may also be obtained as the heat treatment product. An oxide of a rare earth element can be recovered as one of the two kinds of masses present in close contact with each other or as the adhering substance adhering to the sphere surface and forming the single-form mass. Incidentally, the other of the two kinds of masses present in close contact with each other and the sphere forming the single-form mass are each an alloy of an iron group element and carbon. In addition, in the case where a mass microscopically having a two phase structure is obtained, one of the two phase structure is an oxide of a rare earth element, and the other is an alloy of an iron group element and carbon. Therefore, for example, by magnetically separating a powder obtained by grinding this mass, an oxide of a rare earth element can be recovered as a powder. The recovered oxide of a rare earth element can be reduced by molten salt electrolysis, for example, and thus converted into a rare earth metal. In the case where an excess carbon substance in the treatment container after the heat treatment, the mass and carbon substance present in the treatment container can be easily separated from each other by a magnetic method or using a screen. The separated carbon substance may be recovered and reused as described above.

In the case where the workpiece containing at least a rare earth element and an iron group element, to which the method of the present invention is to be applied, contains boron as an additional element, such as in the case of an R—Fe—B based permanent magnet, boron is somewhat contained in an oxide of a rare earth element recovered by separation from an alloy of an iron group element and carbon by the method of the present invention. When such a boron-containing oxide of a rare earth element is reduced by molten salt electrolysis using a fluorine-containing molten salt component, boron contained in the oxide of a rare earth element may react with fluorine to produce harmful boron fluoride. Therefore, in such a case, it is preferable to previously reduce the boron content of the oxide of a rare earth element. The boron content of a boron-containing oxide of a rare earth element can be reduced, for example, by a heat treatment of the boron-containing oxide of a rare earth element together with a carbonate of an alkali metal (lithium carbonate, sodium carbonate, potassium carbonate, etc.) or an oxide of an alkali metal in the presence of carbon, for example. The heat treatment in the presence of carbon may be performed at 1300° C. to 1600° C. using the above carbon substance as a carbon supply source, for example. The heat treatment time is suitably 30 minutes to 5 hours, for example. The amount of a carbonate or an oxide of an alkali metal used may be 0.1 parts by weight to 2 parts by weight per part by weight of a boron-containing oxide of a rare earth element, for example.

EXAMPLES

Hereinafter, the present invention will be described in detail with reference to the examples. However, the present invention should not be construed as being limited to the following descriptions.

Example 1

Magnet processing waste having a particle size of about 10 μm produced during the R—Fe—B based permanent magnet production process (stored in water for seven days to prevent spontaneous ignition) was dehydrated by suction filtration, and then subjected to an oxidation treatment by burning using a rotary kiln (the molar concentration of oxygen contained in the oxidation-treated magnet processing waste: 8.5 times the molar concentration of rare earth elements). The bottom surface of a carbon crucible (made of black lead) having a dimension of φ70 mm×70 mm was covered with carbon black (furnace black manufactured by Tokai Carbon Co., Ltd.; the same hereinafter), then general paper rolled into a cylindrical shape was installed to stand as a partition member in the container, and carbon black was packed between the side surface of the container and the partition member. Next, a mixture of 40 g of the oxidation-treated magnet processing waste and 8 g of carbon black (molar ratio relative to iron contained in the magnet processing waste: 1.86) was placed in the inside surrounded by the partition member, and then subjected to a heat treatment in an industrial argon gas atmosphere (oxygen content: 0.2 ppm, flow rate: 5 L/min; the same hereinafter) at 1450° C. for 1 hour. Subsequently, the carbon crucible was furnace-cooled to room temperature. As a result, two kinds of masses in close contact with each other and carbon black were present in the crucible as the residue. Table 1 shows the results of ICP analysis (apparatus used: ICPV-1017 manufactured by Shimadzu Corporation; the same hereinafter) and gas analysis (apparatus used: EMGA-550W manufactured by HORIBA Ltd.; the same hereinafter) of these two kinds of masses. As is clear from Table 1, it turned out that the main component of one of the masses (mass A) was iron, while the main components of the other (mass B) were rare earth elements, showing that rare earth elements had been separated in the form of oxides from iron (to make sure, X-ray diffraction analysis was separately performed using a standard sample to confirm that the rare earth elements were oxides). After removing the residue from the crucible, the bottom surface of the container and the side surface of the container were observed. As a result, there was no noticeable damage due to the heat treatment. In addition, the weight loss of the carbon crucible by the heat treatment was 0.061%, which is almost the same level of weight loss as in the case of heat-treating only a carbon crucible. Accordingly, it turned out that the heat treatment almost does not consume the carbon crucible. In addition, the same experiment as above was performed, except that black lead powder (manufactured by Tokai Carbon Co., Ltd., ground to a particle size of 125 μm or less; the same hereinafter) was used as a carbon substance to cover the bottom surface of a carbon crucible and also as a carbon substance to be packed between the side surface of the container and a partition member. As a result, as in the case of using carbon black as a carbon substance to cover the bottom surface of a carbon crucible and also as a carbon substance to be packed between the side surface of the container and a partition member, rare earth elements were separated in the form of oxides from iron without causing noticeable damage to the container. The weight loss of the carbon crucible was 0.142%, which is higher than in the case of using carbon black, but is within a practically acceptable range. In addition, the same experiment as above was performed, except that petroleum coke (manufactured by DAINEN CO., LTD.: R Cokes, particle size <5 mm; the same hereinafter) was used as a carbon substance to cover the bottom surface of a carbon crucible and also as a carbon substance to be packed between the side surface of the container and a partition member. Also in this case, as in the case of using carbon black as a carbon substance to cover the bottom surface of a carbon crucible and also as a carbon substance to be packed between the side surface of the container and a partition member, rare earth elements were separated in the form of oxides from iron without causing noticeable damage to the container. The weight loss of the carbon crucible was 0.216%, which is higher than in the case of using carbon black, but is within a practically acceptable range. From the above results, it turned out that in all the cases of using carbon black, black lead powder, and petroleum coke as a carbon substance to cover the bottom surface of a carbon crucible and also as a carbon substance to be packed between the side surface of the container and a partition member, rare earth elements can be separated in the form of oxides from iron without causing noticeable damage to the container or practically problematic weight loss of the container; however, as compared with black lead powder and petroleum coke, carbon black is more effective in suppressing the consumption of a carbon crucible by a heat treatment. The reason thereof is not necessarily clear, but is likely to be as follows. Carbon black is usually in an aggregated state, wherein individual fine particles are fused to each other in a linear chain or in an irregular, complicated branched chain, and thus has a high air content and low density. Therefore, its reactivity with the oxidation-treated magnet processing waste upon a heat treatment is lower as compared with black lead powder and petroleum coke.

TABLE 1

|  | Fe | Nd | Pr | Dy | B | Al | Si | C |
|---|---|---|---|---|---|---|---|---|
| Mass A | 94.0 | — | — | — | — | — | — | 5.7 |
| Mass B | 0.1 | 50.7 | 14.3 | 12.3 | 2.3 | 0.4 | 0.1 | — |

(Unit: mass %, —: below the detection limit)

Example 2

The same experiment as in Example 1 was performed, except that instead of installing general paper rolled into a cylindrical shape to stand as a partition member in a carbon crucible, corrugated paper rolled into a cylindrical shape was installed to stand. As a result, the same results as in Example 1 were obtained.

Example 3

The same experiment as in Example 1 was performed, except that instead of installing general paper rolled into a cylindrical shape to stand as a partition member in a carbon crucible, a partition member having a polygonal cylindrical shape formed of a plurality of wood plates was installed to stand. As a result, the same results as in Example 1 were obtained.

Example 4

The same experiment as in Example 1 was performed, except that instead of installing general paper rolled into a cylindrical shape to stand as a partition member in a carbon crucible, a commercially available carbon sheet rolled into a cylindrical shape was installed to stand. As a result, the same results as in Example 1 were obtained.

Example 5

100 g of the oxidation-treated magnet processing waste described in Example 1 and 20 g of carbon black (molar ratio relative to iron contained in the magnet processing waste: 1.86) housed in a commercially available bag made of polyethylene and mixed in the bag were placed in a carbon crucible (made of black lead) having a dimension of φ110 mm×150 mm. Incidentally, before that, carbon black housed in a commercially available bag made of polyethylene was installed on the bottom surface of the crucible. In addition, carbon black housed in a commercially available bag made of polyethylene was installed also between the bag housing a mixture of the oxidation-treated magnet processing waste and carbon black and the side surface of the container. A heat treatment was performed at 1450° C. for 1 hour in an industrial argon gas atmosphere, and then the carbon crucible was furnace-cooled to room temperature. As a result, two kinds of masses in close contact with each other and carbon black were present in the crucible as the residue. As a result of ICP analysis and gas analysis of these two kinds of masses, it turned out that the main component of one of the masses was iron, while the main components of the other were rare earth elements, showing that rare earth elements had been separated in the form of oxides from iron (to make sure, X-ray diffraction analysis was separately performed using a standard sample to confirm that the rare earth elements were oxides). After removing the residue from the crucible, the bottom surface of the container and the side surface of the container were observed. As a result, there was no noticeable damage due to the heat treatment. In addition, the weight loss of the carbon crucible by the heat treatment was 0.042%, which is almost the same level of weight loss as in the case of heat-treating only a carbon crucible. Accordingly, it turned out that the heat treatment almost does not consume the carbon crucible.

Example 6

The same experiment as in Example 5 was performed, except that an alumina crucible was used instead of a carbon crucible. As a result, the same results as in Example 5 were obtained.

Example 7

The same experiment as in Example 5 was performed, except that the heat treatment temperature was 1300° C. As a result, the same results as in Example 5 were obtained.

Example 8

The same experiment as in Example 5 was performed, except that the heat treatment temperature was 1600° C. As a result, the same results as in Example 5 were obtained.

Example 9

30 g of the oxidation-treated magnet processing waste described in Example 1 and 2.4 g of petroleum coke (molar ratio relative to iron contained in the magnet processing waste: 0.75) housed in a commercially available bag made of polyethylene and mixed in the bag were placed in a carbon crucible (made of black lead) having a dimension of φ70 mm×70 mm. Incidentally, before that, the bottom surface of the crucible was covered with carbon black. In addition, carbon black was packed also between the bag housing a mixture of the oxidation-treated magnet processing waste and petroleum coke and the side surface of the container. A heat treatment was performed at 1450° C. for 1 hour in an industrial argon gas atmosphere, and then the carbon crucible was furnace-cooled to room temperature. As a result, two kinds of masses in close contact with each other and carbon black were present in the crucible as the residue. As a result of ICP analysis and gas analysis of these two kinds of masses, it turned out that the main component of one of the masses was iron, while the main components of the other were rare earth elements, showing that rare earth elements had been separated in the form of oxides from iron (to make sure, X-ray diffraction analysis was separately performed using a standard sample to confirm that the rare earth elements were oxides). After removing the residue from the crucible, the bottom surface of the container and the side surface of the container were observed. As a result, there was no noticeable damage due to the heat treatment. In addition, the weight loss of the carbon crucible by the heat treatment was 0.33%.

Example 10

The same experiment as in Example 9 was performed, except that the heat treatment temperature was 1300° C. As a result, the same results as in Example 9 were obtained.

Example 11

30 g of the oxidation-treated magnet processing waste described in Example 1 and 2.4 g of petroleum coke (molar ratio relative to iron contained in the magnet processing waste: 0.75) housed in a commercially available bag made of polyethylene and mixed in the bag were placed in a carbon crucible (made of black lead) having a dimension of φ70 mm×70 mm. Incidentally, before that, the bottom surface of the crucible was covered with petroleum coke. In addition, petroleum coke was packed also between the bag housing a mixture of the oxidation-treated magnet processing waste and petroleum coke and the side surface of the container. A heat treatment was performed at 1450° C. for 1 hour in an industrial argon gas atmosphere, and then the carbon crucible was furnace-cooled to room temperature. As a result, two kinds of masses in close contact with each other and petroleum coke were present in the crucible as the residue. As a result of ICP analysis and gas analysis of these two kinds of masses, it turned out that the main component of one of the masses was iron, while the main components of the other were rare earth elements, showing that rare earth elements had been separated in the form of oxides from iron (to make sure, X-ray diffraction analysis was separately performed using a standard sample to confirm that the rare earth elements were oxides). After removing the residue from the crucible, the bottom surface of the container and the side surface of the container were observed. As a result, there was no noticeable damage due to the heat treatment. In addition, the weight loss of the carbon crucible by the heat treatment was 0.47%.

Example 12

The same experiment as in Example 11 was performed, except that the heat treatment temperature was 1600° C. As a result, the same results as in Example 11 were obtained.

Example 13

50 g of the oxidation-treated magnet processing waste described in Example 1 was placed in a carbon crucible (made of black lead) having a dimension of φ70 mm×70 mm. Incidentally, before that, the bottom surface of the crucible was covered with 20 g of petroleum coke (molar ratio relative to iron contained in the magnet processing waste: 3.75). A heat treatment was performed at 1450° C. for 1 hour in an industrial argon gas atmosphere, and then the carbon crucible was furnace-cooled to room temperature. As a result, two kinds of masses in close contact with each other and petroleum coke were present in the crucible as the residue. As a result of ICP analysis and gas analysis of these two kinds of masses, it turned out that the main component of one of the masses was iron, while the main components of the other were rare earth elements, showing that rare earth elements had been separated in the form of oxides from iron (to make sure, X-ray diffraction analysis was separately performed using a standard sample to confirm that the rare earth elements were oxides). After removing the residue from the crucible, the bottom surface of the container and the side surface of the container were observed. As a result, there was no noticeable damage due to the heat treatment.

Example 14

The same experiment as in Example 13 was performed, except that the heat treatment temperature was 1300° C. As a result, the same results as in Example 13 were obtained.

Example 15

The same experiment as in Example 13 was performed, except that the heat treatment temperature was 1600° C. As a result, the same results as in Example 13 were obtained.

Example 16

The same experiment as in Example 13 was performed, except that the bottom surface of a carbon crucible was covered with 20 g of black lead powder (molar ratio relative to iron contained in the magnet processing waste: 3.75). As a result, the same results as in Example 13 were obtained.

Example 17

50 g of the oxidation-treated magnet processing waste described in Example 1 was placed in a carbon crucible (made of black lead) having a dimension of φ70 mm×70 mm. Incidentally, before that, the bottom surface of the crucible was covered with 10 g of carbon black (molar ratio relative to iron contained in the magnet processing waste: 1.88). A heat treatment was performed at 1450° C. for 1 hour in an industrial argon gas atmosphere, and then the carbon crucible was furnace-cooled to room temperature. As a result, a single-form mass and carbon black were present in the crucible as the residue. The mass microscopically had a two phase structure including a phase containing iron as a main component and a phase containing rare earth elements and oxygen as main components (based on analysis using SEM-EDX analysis (apparatus used: 54500 manufactured by Hitachi High-Technologies Corporation)). The mass was ground using a commercially available grinding machine, and then a powder of the phase containing iron as a main component having a size of about 5 μm was separated by a magnetic method, whereby a powder of the phase containing rare earth elements and oxygen as main components having a size of about 1 μm was recovered. Incidentally, after removing the residue from the crucible, the bottom surface of the container and the side surface of the container were observed. As a result, there was no noticeable damage due to the heat treatment.

INDUSTRIAL APPLICABILITY

The present invention makes it possible to provide a method according to which a rare earth element can be efficiently recovered from a workpiece containing at least a rare earth element and an iron group element, and also wear and damage to the treatment container can be suppressed, allowing the container to be used repeatedly for a long period of time. In this respect, the present invention is industrially applicable.

The invention claimed is:

1. A method for recovering a rare earth element, comprising the steps of:
    subjecting a workpiece containing at least a rare earth element and an iron group element to an oxidation treatment to produce an oxidation-treated workpiece,
    then placing the oxidation-treated workpiece in a treatment container with a carbon substance interposed between the oxidation-treated workpiece and the bottom surface of the container, and
    performing a heat treatment in an inert gas atmosphere or in vacuum at a temperature of 1300° C. or more,
    thereby separating a rare earth element in the form of an oxide from an iron group element.

2. The method according to claim 1, characterized in that at least part of the workpiece is in granular or powder form having a particle size of 500 μm or less.

3. The method according to claim 1, characterized in that the workpiece has an iron group element content of 30 mass % or more.

4. The method according to claim 1, characterized in that the workpiece is an R—Fe—B based permanent magnet.

5. The method according to claim 1, characterized in that the oxidation-treated workpiece housed in a housing member made of paper, wood, synthetic resin, or carbon is placed in the treatment container.

6. The method according to claim 1, characterized in that a carbon substance housed in a housing member made of paper, wood, synthetic resin, or carbon is interposed between the oxidation-treated workpiece and the bottom surface of the container.

7. The method according to claim 1, characterized in that a carbon substance is further interposed between the oxidation-treated workpiece and the side surface of the container.

8. The method according to claim 7, characterized in that the carbon substance interposed between the oxidation-treated workpiece and the side surface of the container is partitioned from the oxidation-treated workpiece by a partition member made of paper, wood, synthetic resin, or carbon.

9. The method according to claim 7, characterized in that a carbon substance housed in a housing member made of paper, wood, synthetic resin, or carbon is interposed between the oxidation-treated workpiece and the side surface of the container.

10. The method according to claim 1, characterized in that a carbon substance is further placed in the treatment container.

* * * * *